United States Patent
Kishi

(10) Patent No.: US 8,590,042 B2
(45) Date of Patent: Nov. 19, 2013

(54) STORAGE SYSTEM, AND ENCRYPTION KEY MANAGEMENT METHOD AND ENCRYPTION KEY MANAGEMENT PROGRAM THEREOF

(75) Inventor: Masayuki Kishi, Hiratsuka (JP)

(73) Assignees: Hitachi, Ltd., Tokyo (JP); Hitachi Computer Peripherals Co., Ltd., Kanagawa-ken (JP)

( * ) Notice: Subject to any disclaimer, the term of this patent is extended or adjusted under 35 U.S.C. 154(b) by 1333 days.

(21) Appl. No.: 12/078,912

(22) Filed: Apr. 8, 2008

(65) Prior Publication Data
US 2009/0199016 A1    Aug. 6, 2009

(30) Foreign Application Priority Data
Jan. 31, 2008   (JP) ................. 2008-020325

(51) Int. Cl.
*G06F 11/00* (2006.01)
*H04L 9/00* (2006.01)

(52) U.S. Cl.
USPC ................................. 726/23; 380/277

(58) Field of Classification Search
USPC ............. 726/23; 380/277; 705/904; 713/194; 711/161, 162, 164
See application file for complete search history.

(56) References Cited

U.S. PATENT DOCUMENTS

| 6,359,986 B1 * | 3/2002 | Tatebayashi | 380/277 |
| 7,003,116 B2 * | 2/2006 | Riedel et al. | 380/277 |
| 7,171,557 B2 * | 1/2007 | Kallahalla et al. | 713/165 |
| 7,529,927 B2 * | 5/2009 | Peinado et al. | 713/156 |
| 7,885,894 B2 * | 2/2011 | Shimoji et al. | 705/51 |
| 7,934,253 B2 * | 4/2011 | Overcash et al. | 726/22 |
| 2003/0086570 A1 * | 5/2003 | Riedel et al. | 380/277 |
| 2004/0230819 A1 * | 11/2004 | Takahashi | 713/193 |
| 2005/0108484 A1 * | 5/2005 | Park | 711/162 |
| 2005/0172190 A1 * | 8/2005 | Liang | 714/726 |
| 2007/0116290 A1 * | 5/2007 | Yeh | 380/270 |
| 2007/0226441 A1 * | 9/2007 | Uchiumi et al. | 711/164 |
| 2008/0165973 A1 * | 7/2008 | Miranda Gavillan et al. | 380/278 |

FOREIGN PATENT DOCUMENTS

| JP | 2003-244131 | 2/2002 |
| JP | 2004-341768 | 5/2003 |

* cited by examiner

*Primary Examiner* — Eleni Shiferaw
*Assistant Examiner* — Abu Sholeman
(74) *Attorney, Agent, or Firm* — Stites & Harbison PLLC; Juan Carlos A. Marquez, Esq.; Nicholas B. Trenkle, Esq.

(57) ABSTRACT

A user no longer needs to restore key information upon restoring data. Proposed is a storage system having a storage apparatus, a tape library apparatus for backing up data stored in the storage apparatus, and a management terminal for managing the storage apparatus and the tape library apparatus. The management terminal identifies a key of a tape to be restored and restores a management Information file based an a tape management file, a tape group information file and a key information file upon restoring data stored in the tape in the tape library apparatus, and commands the restoration of the tape based on the restored management information file.

14 Claims, 17 Drawing Sheets

| # | CONTENT OF TG INFORMATION FILE | CONFIGURATION INFORMATION AFTER RESTORATION OF TG INFORMATION |
|---|---|---|
| 1 | TG#: n, BACKUP DATE AND TIME, TG ATTRIBUTE, ETC. WkweyID: WkeyID1 RkweyID : RkeyID1 | TG#: n, BACKUP DATE AND TIME, TG ATTRIBUTE, ETC. WkweyID: WkeyID1, Wkwey: INVALID RkweyID : RkeyID1, Rkwey: INVALID |
| 2 | TG#: n, BACKUP DATE AND TIME, TG ATTRIBUTE, ETC. WkweyID: WkeyID2 RkweyID : RkeyID1 | TG#: n, BACKUP DATE AND TIME, TG ATTRIBUTE, ETC. WkweyID: WkeyID2, Wkwey: INVALID RkweyID : RkeyID1, Rkwey: INVALID |
| 3 | TG#: n, BACKUP DATE AND TIME, TG ATTRIBUTE, ETC. WkweyID: WkeyID2 RkweyID : RkeyID2 | TG#: n, BACKUP DATE AND TIME, TG ATTRIBUTE, ETC. WkweyID: WkeyID2, Wkwey: INVALID RkweyID : RkeyID2, Rkwey: INVALID |

| 510 | 511 | 512 | 513 | 514 | 515 | 516 | 517 | 518 | 519 | 520 | 521 | 522 | 523 |
|---|---|---|---|---|---|---|---|---|---|---|---|---|---|
| TG NUMBER | TG CLOSURE STATUS | TG COPY STATUS | MIRROR STATUS | USED TAPE NUMBER (PRIMARY) | USED TAPE NUMBER (SECONDARY) | STORED LU LIST | WRITE DATE AND TIME | KEYWORD | ENCRYPTION STATUS | WkeyID | RkeyID | Wkey | Rkey |
| 0 | NORMAL | COPY_END | ON | 0, 1 | 2, 3 | 2, 4 | 2007/07/20 01:23:45 | DB1_20070720 | ON | 20070718063015_0 | 20070718083015_0 | *** | *** |
| 1 | SECONDARY CLOSURE | COPY_END | ON | 4, 5 | 6, 7 | 2, 4 | 2007/07/19 01:23:45 | DB1_20070719 | ON | 20070719170045_0 | 20070718083015_0 | %%%% | *** |
| 2 | NORMAL | COPY_END | OFF | 9 | | 10, 11, 12 | 2007/07/20 05:55:55 | DB2_20070720 | ON | 20070719170045_0 | 20070719170045_0 | %%%% | %%%% |
| 3 | NORMAL | COPY_END | OFF | 8 | | 20, 21 | 2007/07/20 09:33:33 | DB3_20070720 | OFF | INVALID | INVALID | INVALID | INVALID |

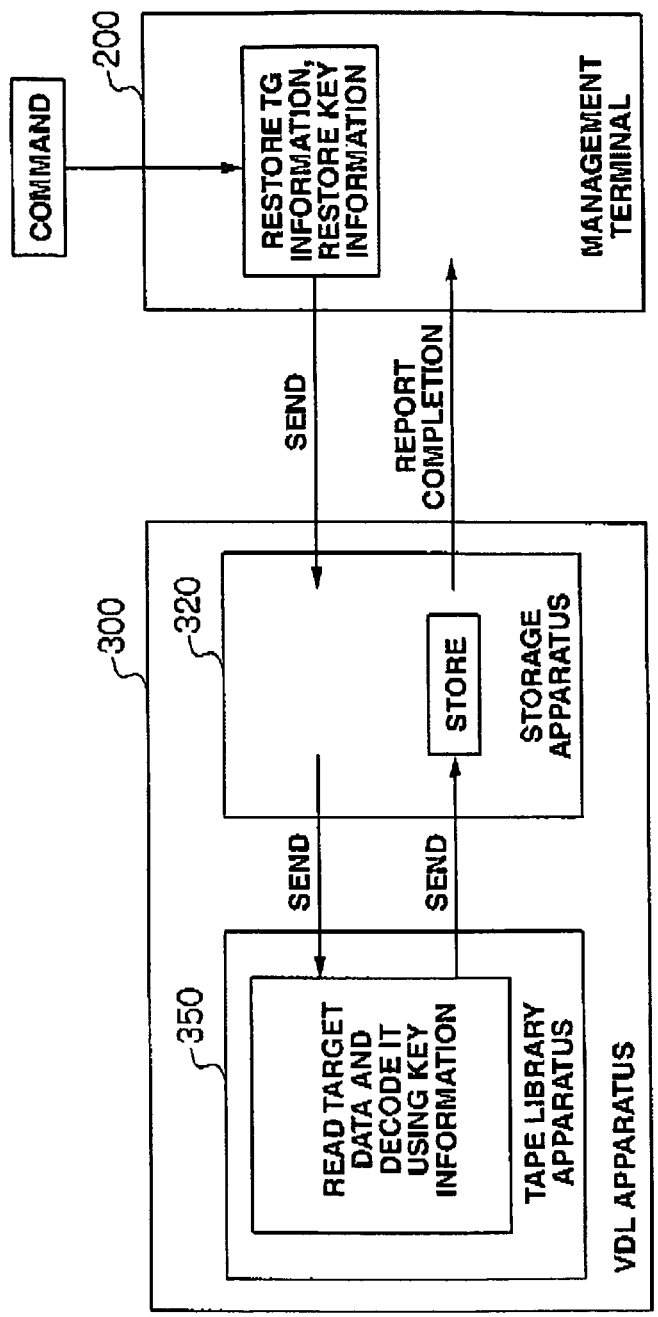

FIG.8

| # | CONTENT OF TG INFORMATION FILE | CONFIGURATION INFORMATION AFTER RESTORATION OF TG INFORMATION |
|---|---|---|
| 1 | TG#: n, BACKUP DATE AND TIME, TG ATTRIBUTE, ETC.<br>WkweyID : WkeyID1<br>RkweyID : RkeyID1 | TG#: n, BACKUP DATE AND TIME, TG ATTRIBUTE, ETC.<br>WkweyID: WkeyID1, Wkwey: INVALID<br>RkweyID : RkeyID1, Rkwey: INVALID |
| 2 | TG#: n, BACKUP DATE AND TIME, TG ATTRIBUTE, ETC.<br>WkweyID : WkeyID2<br>RkweyID : RkeyID1 | TG#: n, BACKUP DATE AND TIME, TG ATTRIBUTE, ETC.<br>WkweyID: WkeyID2, Wkwey: INVALID<br>RkweyID : RkeyID1, Rkwey: INVALID |
| 3 | TG#: n, BACKUP DATE AND TIME, TG ATTRIBUTE, ETC.<br>WkweyID : WkeyID2<br>RkweyID : RkeyID2 | TG#: n, BACKUP DATE AND TIME, TG ATTRIBUTE, ETC.<br>WkweyID: WkeyID2, Wkwey: INVALID<br>RkweyID : RkeyID2, Rkwey: INVALID |

FIG.9

| # | CONFIGURATION INFORMATION AFTER RESTORATION OF TG INFORMATION | CONTENT OF KEY INFORMATION FILE | CONFIGURATION INFORMATION AFTER RESTORATION OF KEY INFORMATION |
|---|---|---|---|
| 1 | TG#: n, BACKUP DATE AND TIME, TG ATTRIBUTE, ETC. WkweyID: WkeyID1, Wkwey: INVALID RkweyID: RkeyID1, Rkwey: INVALID | TG#: n WkweyID: WkeyID1, Wkwey: Wkwey1 RkweyID: RkeyID1, Rkwey: Rkwey1 | TG#: n, BACKUP DATE AND TIME, TG ATTRIBUTE, ETC. WkweyID: WkeyID1, Wkwey: Wkwey1 RkweyID: RkeyID1, Rkwey: Rkwey1 |
| 2 | (Status of #1 in FIG. 8) | TG#: n WkweyID: WkeyID2, Wkwey: Wkwey2 RkweyID: RkeyID1, Rkwey: Rkwey1 | TG#: n, BACKUP DATE AND TIME, TG ATTRIBUTE, ETC. WkweyID: WkeyID3, Wkwey: Wkwey3 RkweyID: RkeyID1, Rkwey: Rkwey1 |
| 3 |  | TG#: n WkweyID: WkeyID2, Wkwey: Wkwey2 RkweyID: RkeyID2, Rkwey: Rkwey2 | KEY INFORMATION RESTORATION IS NOT POSSIBLE |
| 4 | TG#: n WkweyID: WkeyID2, Wkwey: INVALID RkweyID: RkeyID1, Rkwey: INVALID | TG#: n WkweyID: WkeyID1, Wkwey: Wkwey1 RkweyID: RkeyID1, Rkwey: Rkwey1 | TG#: n, BACKUP DATE AND TIME, TG ATTRIBUTE, ETC. WkweyID: WkeyID3, Wkwey: Wkwey3 RkweyID: RkeyID1, Rkwey: Rkwey1 |
| 5 | (Status of #2 in FIG. 8) | TG#: n WkweyID: WkeyID2, Wkwey: Wkwey2 RkweyID: RkeyID1, Rkwey: Rkwey1 | TG#: n, BACKUP DATE AND TIME, TG ATTRIBUTE, ETC. WkweyID: WkeyID2, Wkwey: Wkwey2 RkweyID: RkeyID1, Rkwey: Rkwey1 |
| 6 |  | TG#: n WkweyID: WkeyID2, Wkwey: Wkwey2 RkweyID: RkeyID2, Rkwey: Rkwey2 | KEY INFORMATION RESTORATION IS NOT POSSIBLE |
| 7 | TG#: n WkweyID: WkeyID2, Wkwey: INVALID RkweyID: RkeyID2, Rkwey: INVALID | TG#: n WkweyID: WkeyID1, Wkwey: Wkwey1 RkweyID: RkeyID1, Rkwey: Rkwey1 | KEY INFORMATION RESTORATION IS NOT POSSIBLE |
| 8 | (Status of #3 in FIG. 8) | TG#: n WkweyID: WkeyID2, Wkwey: Wkwey2 RkweyID: RkeyID1, Rkwey: Rkwey1 | TG#: n, BACKUP DATE AND TIME, TG ATTRIBUTE, ETC. WkweyID: WkeyID2, Wkwey: Wkwey2 RkweyID: RkeyID1, Rkwey: Rkwey1 |
| 9 |  | TG#: n WkweyID: WkeyID2, Wkwey: Wkwey2 RkweyID: RkeyID2, Rkwey: Rkwey2 | TG#: n, BACKUP DATE AND TIME, TG ATTRIBUTE, ETC. WkweyID: WkeyID2, Wkwey: Wkwey2 RkweyID: RkeyID2, Rkwey: Rkwey2 |

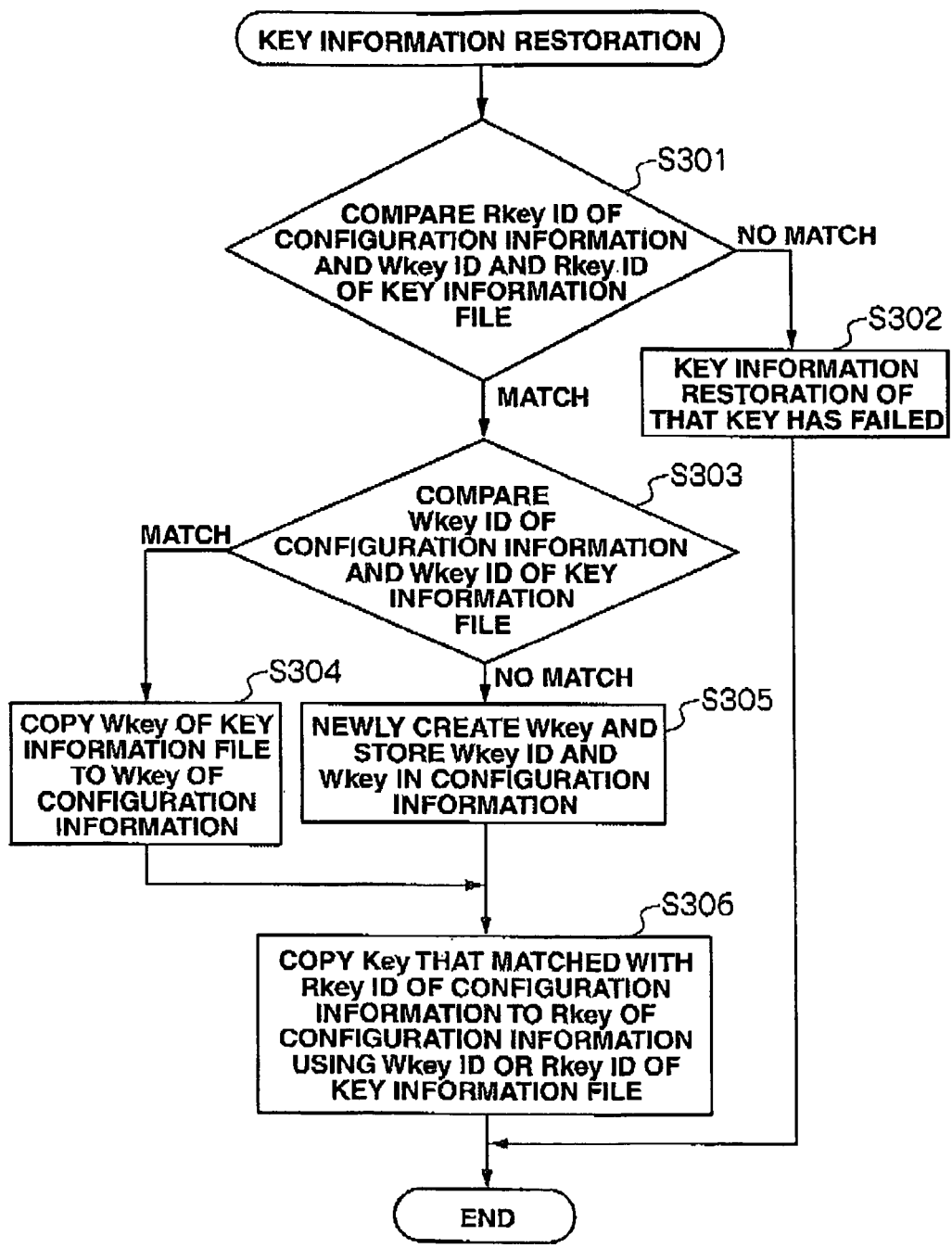

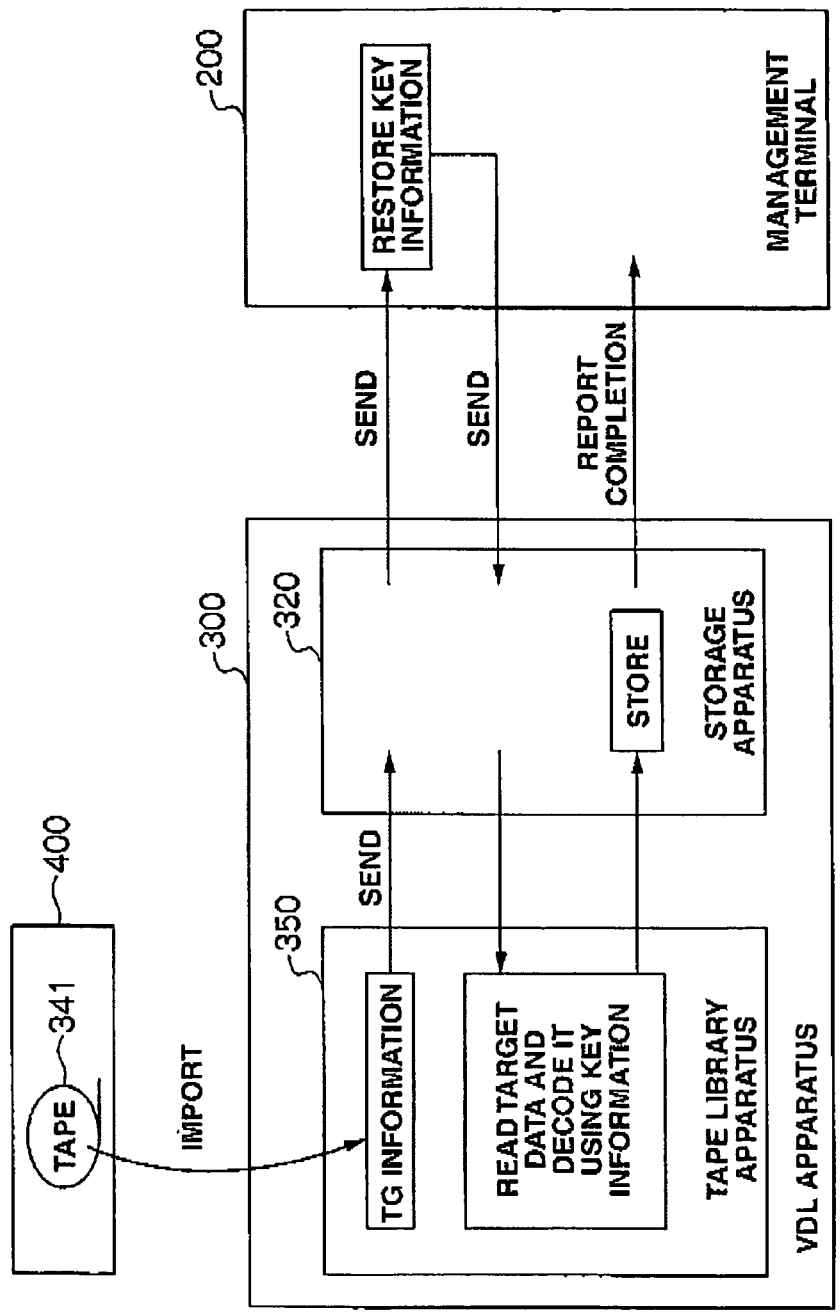

FIG.13

| # | CONTENT OF MANAGEMENT INFORMATION IN TAPE | CONFIGURATION INFORMATION AFTER TAPE IMPORT |
|---|---|---|
| 1 | TG#: n BACKUP DATE AND TIME, TG ATTRIBUTE, ETC. WkweyID: WkeyID1 | TG#: n BACKUP DATE AND TIME, TG ATTRIBUTE, ETC. WkweyID: WkeyID1, Wkwey :INVALID RkweyID : RkeyID1, Rkwey :INVALID |
| 2 | TG#: n BACKUP DATE AND TIME, TG ATTRIBUTE, ETC. WkweyID: WkeyID2 | TG#: n BACKUP DATE AND TIME, TG ATTRIBUTE, ETC. WkweyID: WkeyID2, Wkwey :INVALID RkweyID : RkeyID2, Rkwey :INVALID |

FIG.14

| # | CONFIGURATION INFORMATION AFTER TAPE IMPORT | CONTENT OF KEY INFORMATION FILE | CONFIGURATION INFORMATION AFTER RESTORATION OF KEY INFORMATION |
|---|---|---|---|
| 1 | TG#: n, BACKUP DATE AND TIME, TG ATTRIBUTE, ETC.<br>WkweyID: WkeyID1, Wkwey: INVALID<br>RkweyID: RkeyID1, Rkwey: INVALID | TG#: n<br>WkweyID: WkeyID1, Wkwey: Wkwey1<br>RkweyID: RkeyID1, Rkwey: Rkwey1 | TG#: n, BACKUP DATE AND TIME, TG ATTRIBUTE, ETC.<br>WkweyID: WkeyID1, Wkwey: Wkwey1<br>RkweyID: RkeyID1, Rkwey: Rkwey1 |
| 2 | (Status of #1 in FIG. 13) | TG#: n<br>WkweyID: WkeyID2, Wkwey: Wkwey2<br>RkweyID: RkeyID1, Rkwey: Rkwey1 | TG#: n, BACKUP DATE AND TIME, TG ATTRIBUTE, ETC.<br>WkweyID: WkeyID3, Wkwey: Wkwey3<br>RkweyID: RkeyID1, Rkwey: Rkwey1 |
| 3 |  | TG#: n<br>WkweyID: WkeyID2, Wkwey: Wkwey2<br>RkweyID: RkeyID2, Rkwey: Rkwey2 | KEY INFORMATION RESTORATION IS NOT POSSIBLE |
| 4 | TG#: n<br>WkweyID: WkeyID2, Wkwey: INVALID<br>RkweyID: RkeyID2, Rkwey: INVALID | TG#: n<br>WkweyID: WkeyID1, Wkwey: Wkwey1<br>RkweyID: RkeyID1, Rkwey: Rkwey1 | KEY INFORMATION RESTORATION IS NOT POSSIBLE |
| 5 | (Status of #2 in FIG. 13) | TG#: n<br>WkweyID: WkeyID2, Wkwey: Wkwey2<br>RkweyID: RkeyID1, Rkwey: Rkwey1 | TG#: n, BACKUP DATE AND TIME, TG ATTRIBUTE, ETC.<br>WkweyID: WkeyID2, Wkwey: Wkwey2<br>RkweyID: RkeyID2, Rkwey: Rkwey2 |
| 6 |  | TG#: n<br>WkweyID: WkeyID2, Wkwey: Wkwey2<br>RkweyID: RkeyID2, Rkwey: Rkwey2 | TG#: n, BACKUP DATE AND TIME, TG ATTRIBUTE, ETC.<br>WkweyID: WkeyID2, Wkwey: Wkwey2<br>RkweyID: RkeyID2, Rkwey: Rkwey2 | ated first key, first key ID, second key, and second key ID upon

STORAGE SYSTEM, AND ENCRYPTION KEY MANAGEMENT METHOD AND ENCRYPTION KEY MANAGEMENT PROGRAM THEREOF

CROSS-REFERENCES

This application relates to and claims priority from Japanese Patent Application No 2008-020325, filed on Jan. 31, 2008, the entire disclosure of which is incorporated herein by reference.

BACKGROUND

The present invention generally relates to a storage system and its encryption key management method and encryption key management program. In particular, the present invention can be suitably applied to a storage system that manages an encryption key for restoring data stored on a tape, and to its encryption key management method and encryption key management program.

Technology is known for controlling the reading and writing of electronic information using an encryption key upon storing such electronic information in a storage medium (for instance, refer to Japanese Patent Laid-Open Publication No. 2004-341768 and Japanese Patent Laid-Open Publication No. 2003-244131). With a tape apparatus, measures are taken to prevent the loss or leakage of tape, or to prevent the decryption of encrypted data in the tape pursuant to users' needs by periodically changing the apparatus-side encryption key.

When restoring data from a tape, assuming that a key corresponding to the storage apparatus with a tape function has been changed, data cannot be restored from the tape since the data encryption key will not match. Thus, it is necessary to return the key to the state before change, and there is "key information backup/restoration" as a method for achieving the above. This method is used for the user to back up key information in the system disk of the storage apparatus, or to restore the key to the state before change from the backed up key information.

SUMMARY

Nevertheless, the "key backup/restoration" method requires the management of data (file) before and after the key change, and is complicated in that it requires the user's operation. Moreover, in light of the process from "change of key" to "backup to tape," when restoring the configuration information of such transient state, there is a problem in that the user will not know whether the operation to be performed after the restoration of the configuration information is tape backup based on a post-change key or tape restoration based on a pre-change key.

The present invention was devised in view of the foregoing problems. Thus, an object of the present invention is to provide a storage system and its encryption key management method and encryption key management program that does not require a user to restore key information upon restoring data.

Thus, the present invention provides a storage system comprising a storage apparatus, a tape library apparatus for backing up data stored in the storage apparatus, and a management terminal for managing the storage apparatus and the tape library apparatus. The storage apparatus includes a key creation unit for creating a first key for encrypting data upon backing up data in a tape of the tape library apparatus, a first key ID of the first key, a second key for decrypting data that was encrypted with the first key, and a second key ID of the second key, and a management information file for associating management information concerning data with the created first key, first key ID, second key, and second key ID upon backing up the data in the storage apparatus to a tape in the tape library apparatus. The tape library apparatus includes a data processing unit for encrypting data using the first key ID upon writing data into the tape, and decrypting data of the tape using the second key ID upon reading data from the tape. The tape includes a tape management file containing at least the first key ID and the second key ID among the management information. The management terminal includes a tape group information file for backing up information containing the first key ID and the second key ID stored in the management information file, a key information file for backing up the first key, the first key ID, the second key and the second key ID stored in the management information file, a key information processing unit for identifying a key of a tape to be restored and restoring the management information file based on the tape management file, the tape group information file and the key information file upon restoring data stored in the tape in the tape library apparatus, and a command unit for commanding the restoration of the tape based on the management information file restored with the key information processing unit.

According to the present invention, it is possible to propose a storage system and its encryption key management method and encryption key management program that does not require a user to restore key information upon restoring data.

DESCRIPTION OF DRAWINGS

FIG. 3 is a diagram showing the contents stored in a tape group information table according to the present invention;

FIG. 7 is a view showing a frame format briefly explaining data restoration using TG information restoration processing and key information restoration processing according to the present invention;

FIG. 8 is a state diagram showing the status of the key and key ID after restoration of the TG information based on TG information restoration under the preconditions based on the transition diagram according to the present invention;

FIG. 9 is a state diagram showing the status of the key and key ID restored based on key information restoration after the TG information restoration according to the present invention;

FIG. 11 is a flowchart showing key information restoration processing according to the present invention;

FIG. 12 is a view showing a frame format briefly explaining data restoration using key information restoration processing after tape import according to the present invention;

FIG. 13 is a state diagram showing the status of the key and key ID after restoration of TG information via tape import under the preconditions based on the transition diagram according to the present invention;

FIG. 14 is a state diagram showing the status of the key and key ID restored based on key information restoration after TG information restoration according to the present invention;

DETAILED DESCRIPTION

Technology is known for controlling the reading and writing of electronic information using an encryption key upon storing such electronic information in a storage medium. With a tape apparatus, measures are taken to prevent the loss or leakage of tape, or to prevent the decryption of encrypted data in the tape pursuant to users' needs by periodically changing the apparatus-side encryption key.

When restoring data from a tape, assuming that a key corresponding to the storage apparatus with a tape function has been changed, data cannot be restored from the tape since the data encryption key will not match. Thus, it is necessary to return the key to the state before change. But since this method is used for the user to back up key information in the system disk of the storage apparatus, or to restore the key to the state before change from the backed up key information, this method requires the management of data (file) before and after the key change, and is complicated in that it requires the user's operation. Moreover, in light of the process from "change of key" to "backup to tape," when restoring the configuration information of such transient state, there is a problem in that the user will not know whether the operation to be performed after the restoration of the configuration information is tape backup based on a post-change key or tape restoration based on a pre-change key.

Thus, the present invention is able to perform tape restoration after the key change, without the user restoring key information, by retaining the two types of data encryption keys of Wkey and Rkey explained in the following embodiment in a storage system configured from a management terminal, and a storage apparatus with a tape apparatus.

Embodiments of the present invention are now explained with reference to the attached drawings. Incidentally, the embodiments explained below are not intended to limit the scope of the appended claims in any way, and the entire combination of features explained in the embodiments are not necessarily required as the means for solving the problems of the present invention.

Figure 1:
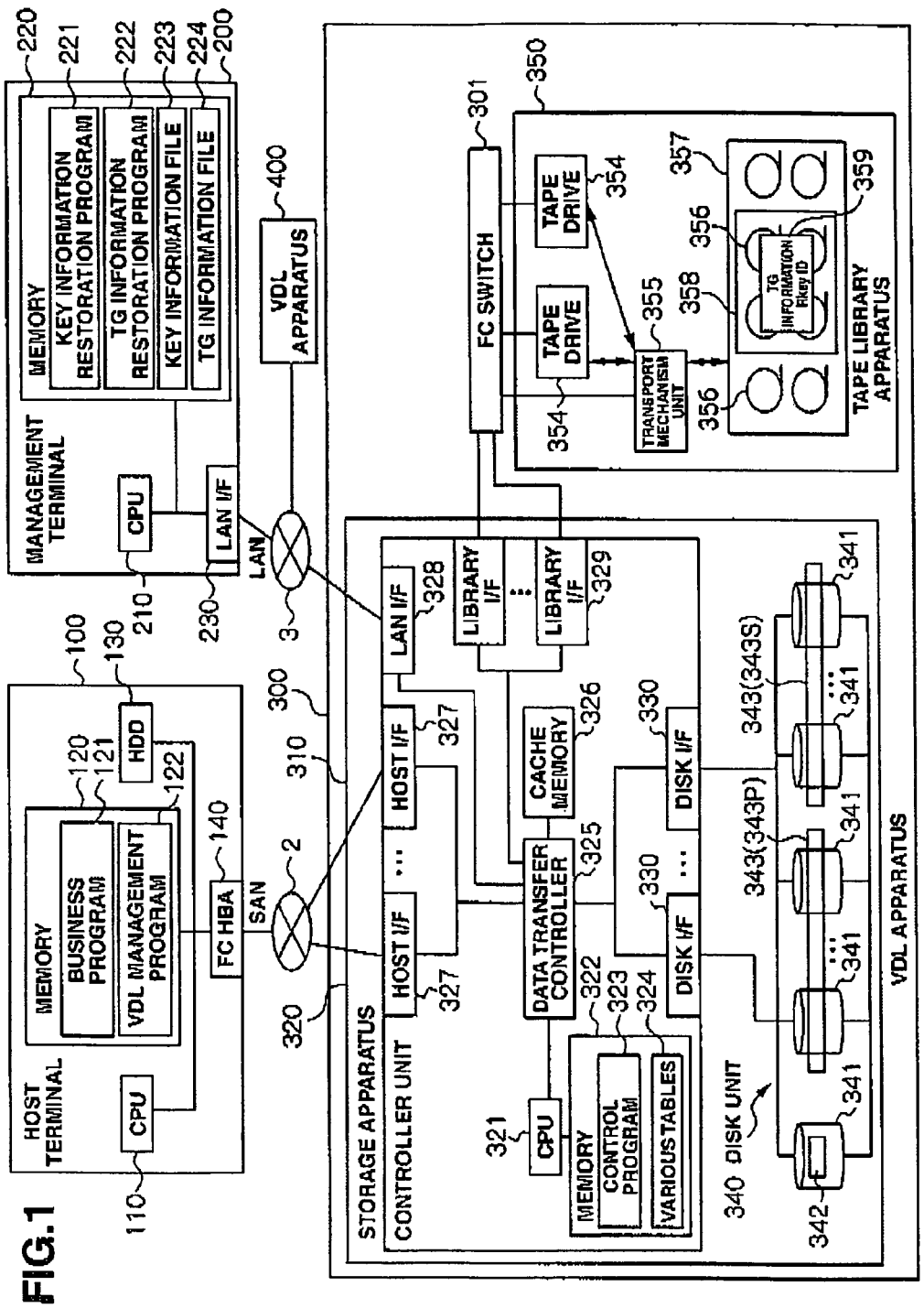
FIG. 1 is a diagram showing the configuration of a storage system according to the present invention.

FIG. 1 is a diagram showing the configuration of a storage system 1 according to the present invention.

The storage system 1 includes a host terminal 100, a management terminal 200, a VDL apparatus 300, and a VDL apparatus 400. The host terminal 100 and the VDL apparatus 300 are connected via a SAN (Storage Area Network) 2. The management terminal 200 is connected respectively to the VDL apparatuses 300, 400 via a LAN (Local Area Network) 3. Although the VDL apparatus 400 is shown to be connected only to the LAN 3, the configuration may be such that it is also connected to the host terminal 100, or connected to another host terminal. The number of host terminals and VDL apparatuses is not limited to the quantity shown in FIG. 1, and the storage system 1 may be configured by including two or more host terminals and three or more VDL apparatuses.

The host terminal 100 includes a CPU 110, a memory 120, an HDD (Hard Disk Drive) 130, and an FC HBA (Fiber Channel Host Bus Adapter) 140. The CPU 110, the memory 120, the HDD 130 and the FC HBA 140 are mutually connected. The memory 120 stores a business program 121, and a VDL apparatus management program 122. The business program 121 is a program for issuing a write request or a read request of data to the VDL apparatus 300. The VDL apparatus management program 122 is a program for managing the mirroring, backup processing, restoration processing and so on of data by the VDL apparatus 300.

The CPU 110 realizes the functions of the business program 121 and the VDL apparatus management program 122 by reading and executing the business program 121 and the VDL apparatus management program 122.

The management terminal 200 includes a CPU 210, a memory 220, and a LAN I/F 230. The CPU 210, the memory 220, and the LAN I/F 230 are mutually connected. The memory 220 stores, in addition to well-known programs for managing the VDL apparatus 300, a key information restoration program 221 and a TG information restoration program 222, and additionally stores a key information file 223 and a TG (tape group) information file.

The CPU 210 realizes the functions of the key information restoration program 221 and the TG information restoration program 222 by reading and executing the key information restoration program 221 and the TG information restoration program 222. The key information restoration program 221 is a program for causing the CPU 210 to execute key information restoration, and the TG information restoration program 222 is a program for causing the CPU 210 to execute TG information restoration, and these programs will be explained in detail later. Information to be stored in the key information file 223 and the TG information file 224 will also be explained later.

The VDL apparatus 300 is a storage apparatus equipped with a tape read/write function, and is configured by the storage apparatus 310 and the tape library apparatus 350 being connected to an FC (Fiber Channel) switch 301.

The storage apparatus 310 includes a controller unit 320 and a disk unit 340. The controller unit 320 includes a CPU 321, a memory 322, a data transfer controller 325, a cache memory 326, a plurality of host I/Fs 327, a LAN I/F 328, a plurality of library I/Fs 329, and a plurality of disk I/Fs 330. The data transfer controller 325 and the CPU 321, memory 322, cache memory 326, host I/Fs 327, LAN I/F 328 and disk I/Fs 330 are connected mutually, and the library I/Fs 330 are connected to the cache memory 326.

The CPU 321 controls the VDL apparatus 300 by executing the programs stored in the memory 322. The memory 322 stores various control programs 322 and various tables 324. The various control programs 322 and the various tables 324 stored in the memory 322 will be described later with reference to FIG. 2. The host I/F 327 controls the exchange of data between the controller unit 320 and the host terminal 100. The LAN I/F 328 controls the exchange of data between the controller unit 320 and the management terminal 200. The library I/F 329 controls the exchange of data between the controller unit 320 and the tape library apparatus 350. The data transfer controller 325 controls the exchange of data among the host terminal 100, the management terminal 200, the disk drive 341, the tape library apparatus 350, the cache memory 326 and the CPU 321. The cache memory 326 temporarily stores data and the like that are exchanged among the host terminal 100, the management terminal 200, and the disk drive 341. The disk I/F 330 controls the exchange of data between the controller unit 320 and the disk unit 340.

The disk unit 340 includes a plurality of disk drives 341. These disk drives 341 are connected to a plurality of disk I/Fs 330. The plurality of disk drives 341 are set with volumes in LU (Logical Units). Data is made redundant between a primary volume 343P and a secondary volume 343S configured from prescribed LUs. One disk drive among the plurality of disk drives 341 configures a system disk for storing configuration information 342. The configuration information 342 will be explained later with reference to FIG. 3. Incidentally, although a case was explained with only one system disk storing the configuration information 342 in FIG. 1, redundancy can be retained by configuring the system disk from a plurality of disk drives 341.

The tape library apparatus 300 includes a plurality of tape drives 354, a transport mechanism unit 355, a tape 356, and a tape storage unit 357. The plurality of tape drives 354 and the transport mechanism unit 355 are connected to the FC switch 301.

Figure 16:
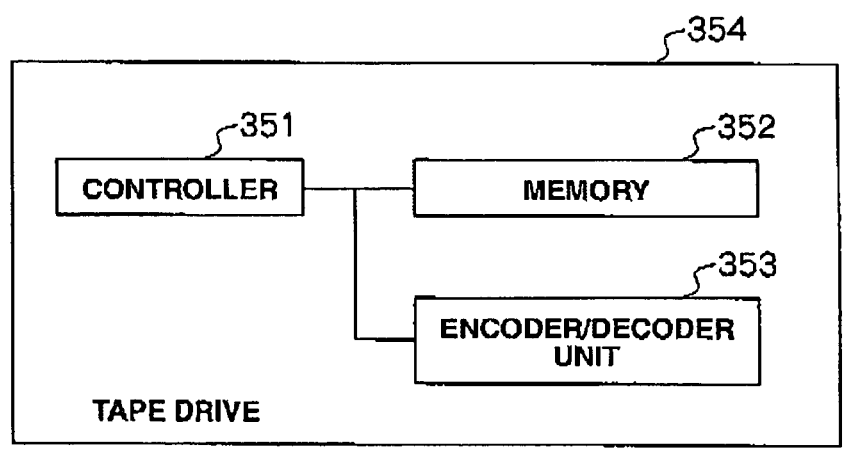
FIG. 16 is a diagram showing the internal configuration of a tape drive according to the present invention.

The tape drive 354 reads data from the tape 356, or writes data on the tape 356. The tape drive 354 is now explained in detail with reference to FIG. 16. As shown in FIG. 16, the tape drive 354 includes a controller 351, a memory 352 and an encoder/decoder unit 353. The controller 351 comprehensively controls the tape drive 354. The memory 352 temporarily stores key information and the like used for the encryption and decryption of data. The encoder/decoder unit 353 encodes data using the key information stored in the memory 352 upon writing data onto the tape 356 transported into the tape drive 354, and decodes data using the key information stored in the memory 352 upon reading data from the tape 356 transported into the tape drive 354.

The transport mechanism unit 355 transports the tape 356 of a designated tape group to the tape drive 354, and transports the tape 356 from the tape drive 354 to the tape storage unit 357. The tape storage unit 359 stores a plurality of tapes 356. The tape 356 stores information such as the TG information containing information showing the tape group, and key information (Rkey ID described later) for decrypting data. For example, the tape group 359 is configured from four tapes 356.

Since the VDL apparatus 400 is configured the same as the VDL apparatus 300, the illustration and detailed explanation of the internal configuration of the VDL apparatus 400 are omitted.

The various programs 323 and various tables 324 stored in the memory 322 of the storage apparatus 310 are now explained with reference to FIG. 2.

Figure 2:
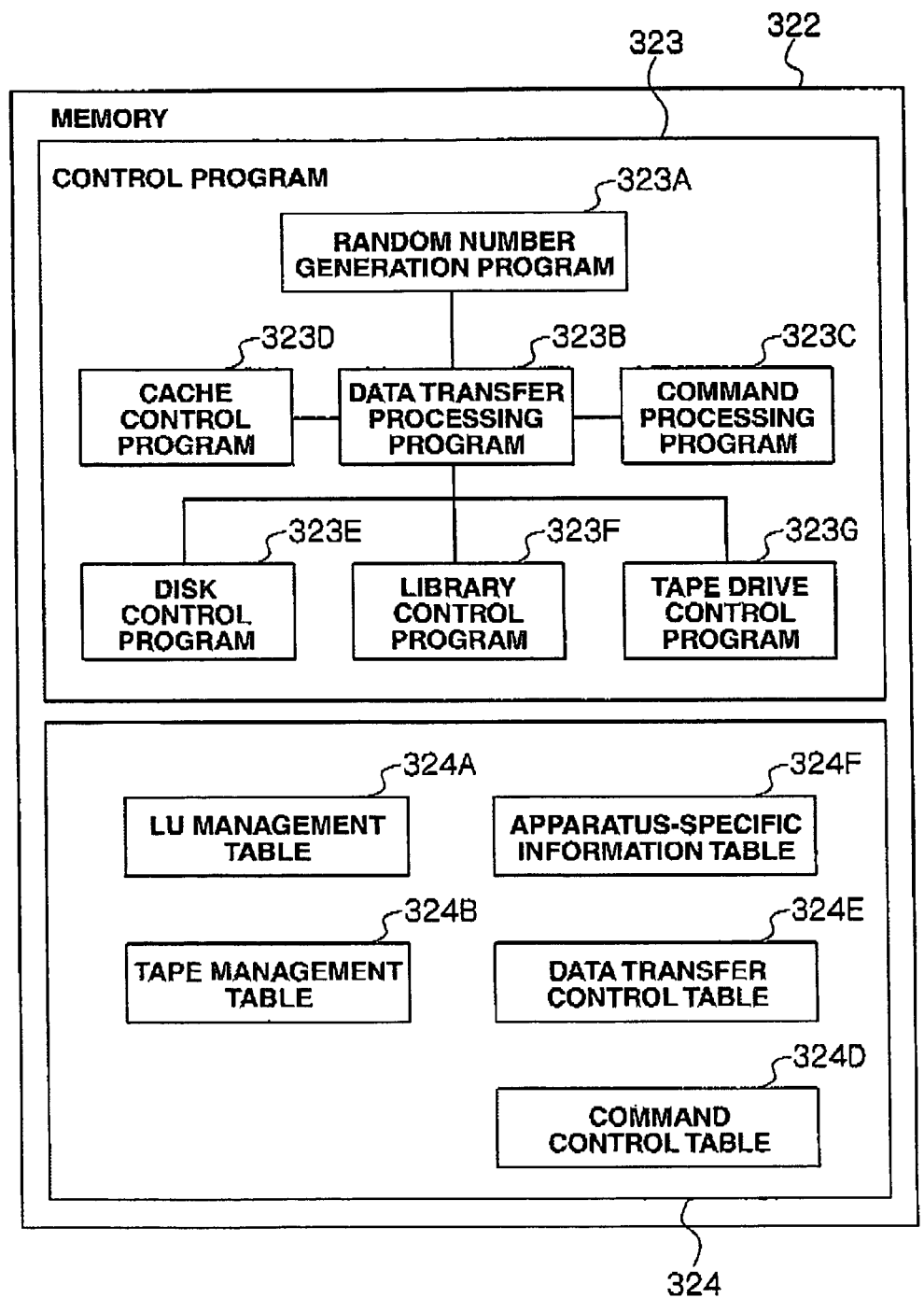
FIG. 2 is a diagram showing the contents stored in a memory according to the present invention.

As shown in FIG. 2, the memory 322 stores, as the various programs 323, a random number generation program 323A, a data transfer processing program 323B, a command processing program 323C, a cache control program 323D, a disk control program 323E, a library control program 323F, and a tape drive control program 323G. The memory 322 additionally stores, as the various tables 323, an LU (Logical Unit) management table 324A, a tape management table 324B, a command control table 324D, an apparatus-specific Information table 324F, and a data transfer control table 324E.

The random number generation program 323A is a program for causing the CPU 321 to control the generation of a random number to be used upon creating key information.

The command processing program 323C is a program for causing the CPU 321 to interpret a command received from the host terminal 100 and a command received from the management terminal 200, and control the corresponding processing.

The data transfer processing program 323B is a program for causing the CPU 321 to control the transfer of data.

The cache control program 323D is a program for causing the CPU 321 to temporarily cache the data to be read from or written into the cache memory 326, and to control the reading or writing of such data.

The disk control program 323E is a program for causing the CPU 321 to control the writing of data into the disk drive 341 and the reading of data from the disk drive 341.

The tape drive control program 323F is a program for causing the CPU 321 to control the data drive 354 for writing data onto the tape 356, and reading data from the tape 356.

The library control program 323G is a program for causing the CPU 321 to control the transport mechanism unit 355 for transporting the tape 356 stored In the tape storage unit 357 to the tape drive 354, and for transporting the tape 356 from the tape drive 354 to the tape storage unit 367.

The LU management table 324A and the tape management table 324B are tables for managing the storage area of data and the like, and the command control table 324D and the data transfer control table 324E are tables for managing the storage of data and the like. Since the LU management table 324A, the tape management table 324B, the command control table 324D and the data transfer control table 324E are not directly related to the present invention, the detailed explanation thereof is omitted.

The apparatus-specific information table 324F is a table for storing apparatus-specific information to be used upon creating key information. For example, apparatus-specific information would be the serial number of the storage apparatus 310, a prescribed date and time, a sequence number, and the combinations thereof. When using unique information such as a serial number that is normally stored in the apparatus as the key information, such information shall be used, and the apparatus-specific information table 324F may be omitted from the configuration.

FIG. 3 is a diagram showing the configuration information table storing the configuration information 343. As shown in FIG. 3, the configuration information table 500 includes a TG number column 510, a TG closure status column 511, a TG copy status column 512, a mirror status column 513, a used tape number (primary) column 514, a used tape number (secondary) column 515, a stored LU list column 516, a write date and time column 517, a keyword column 518, an encryption status column 519, a Wkey ID column 520, an Rkey ID column 521, a Wkey column 522, and an Rkey column 523.

The TG number column 510 stores the TG number that uniquely shows the tape group to become the storage unit for storing data. The TG closure status column 511 stores Information showing whether the corresponding TG is closed, normal or undefined. The TG copy status column 512 stores information of the status concerning TG copy. The mirror status column 513 stores information showing whether the corresponding TG is of a mirror status; that is, whether data is being stored redundantly. The used tape number (primary) column 514 stores the tape number of the tap 356 belonging to the TG. The used tape number (secondary) column 515 stores the tape number of the secondary tape 356 when the TG is of a mirror status. The stored LU list column 516 stores a list of the LU numbers of the volumes backed up to the corresponding TG The write date and time column 517 stores the date and time that the data was written into the TG. The keyword column 518 stores an arbitrarily set keyword. The encryption status column 519 stores information regarding whether the data has been encrypted.

For example, according to the first record, the TG number Is of a "0" status, the TG closure status is of a "normal" status, the TG copy status is of a "COPY_END" status, the used tape number (primary) is of a "0, 1" status, the used tape number (secondary) is of a "2, 3" status, the stored LU list is of a "2, 4" status, the write date and time Is of a "Jul. 7, 2007 01:23: 45" status, the keyword is of a "DB1_20070720" status, the encryption status is of an "ON" status, the Wkey ID is of a "20070718083015_0" status, the Rkey ID is of a "20070718083015_0" status, the Wkey is of a "**" status, and the Rkey is of a "" status. Incidentally, "**" shows an encrypted status.

The Wkey ID column 520, the Rkey ID column 521, the Wkey column 522 and the Rkey column 523 are columns for storing key information. Details concerning the Wkey ID, the Rkey ID, the Wkey and the Rkey to be stored therein will be explained later.

The flow of data backup in a conventional VDL apparatus is now explained. Data when the business program 121 of the host terminal 100 is executed is stored in the primary volume 343P via the FC HBA 140, the SAN 2, the host I/F 327, the data transfer controller 325, and the disk I/F 330. Data written into the primary volume 343P of the storage apparatus 310 is written into the secondary volume 323S at a prescribed timing, and the data is made redundant thereby. Subsequently, the data is backed up to the tape 356 of the tape library apparatus 350 via the disk I/F 330, the data transfer controller 325, the library I/F 329, and the FC switch 301.

The flow of data restoration in a conventional VDL apparatus is now explained. For example, when data to be read by the management terminal 200 is designated, the tape 356 written with such data is transported to the tape drive 354 with the transport mechanism unit 355. The data read from the tape 356 to the tape drive 354 is written into the secondary volume 343S via the FC switch 301, the library I/F 329, the data transfer controller 325, and the disk I/F 330. The data written into the secondary volume 343S is reverse-copied to the primary volume 343P. The intended data can thereby be restored.

In the ensuing explanation, upon backing up or restoring data in the VDL apparatus 300, or upon importing tape to another VDL apparatus 400, data is encrypted and decrypted upon backing up such data using an encryption key. The following explains the data processing using an encryption key in the VDL apparatus 300.

The encryption key to be used for encrypting data is foremost explained. Specifically, with respect to this encryption key, a Wkey is created using a random number generated with the random number generation program 223A, encrypted using the apparatus-specific information in the apparatus-specific information 224F, and thereafter stored in the configuration information table 500. Thus, when the Wkey is to be read from the configuration information table 500, it is decrypted with the apparatus-specific information and then read. The Wkey is used upon writing (backing up) data onto the tape. In addition, the Wkey is copied to the Rkey during the creation or backup of the tape group. The Rkey is used as a decryption key upon reading (restoring) data. This Rkey is also encrypted with the apparatus-specific information, stored in the configuration information table 500, and, when it is to be read, decrypted with the apparatus-specific information and then read.

During the creation of the Wkey, a Wkey ID that is unique among all VDL apparatuses (VDL apparatuses 300, 400 in this embodiment) is created, and the Wkey ID is copied as the Rkey ID when the Wkey is copied to the Rkey. The timing to of creating the Wkey and the Wkey ID, and the timing of copying to the Rkey and the Rkey ID will be described later with reference to FIG. 4. With respect to the encryption key, when the management terminal 200 issues a command for changing the encryption key, the processing for creating the encryption key is executed once again in the storage apparatus 310, and a new Wkey and Wkey ID are created And the new Wkey and Wkey ID are copied as the Rkey and Rkey ID upon backing up the data.

Figure 4:
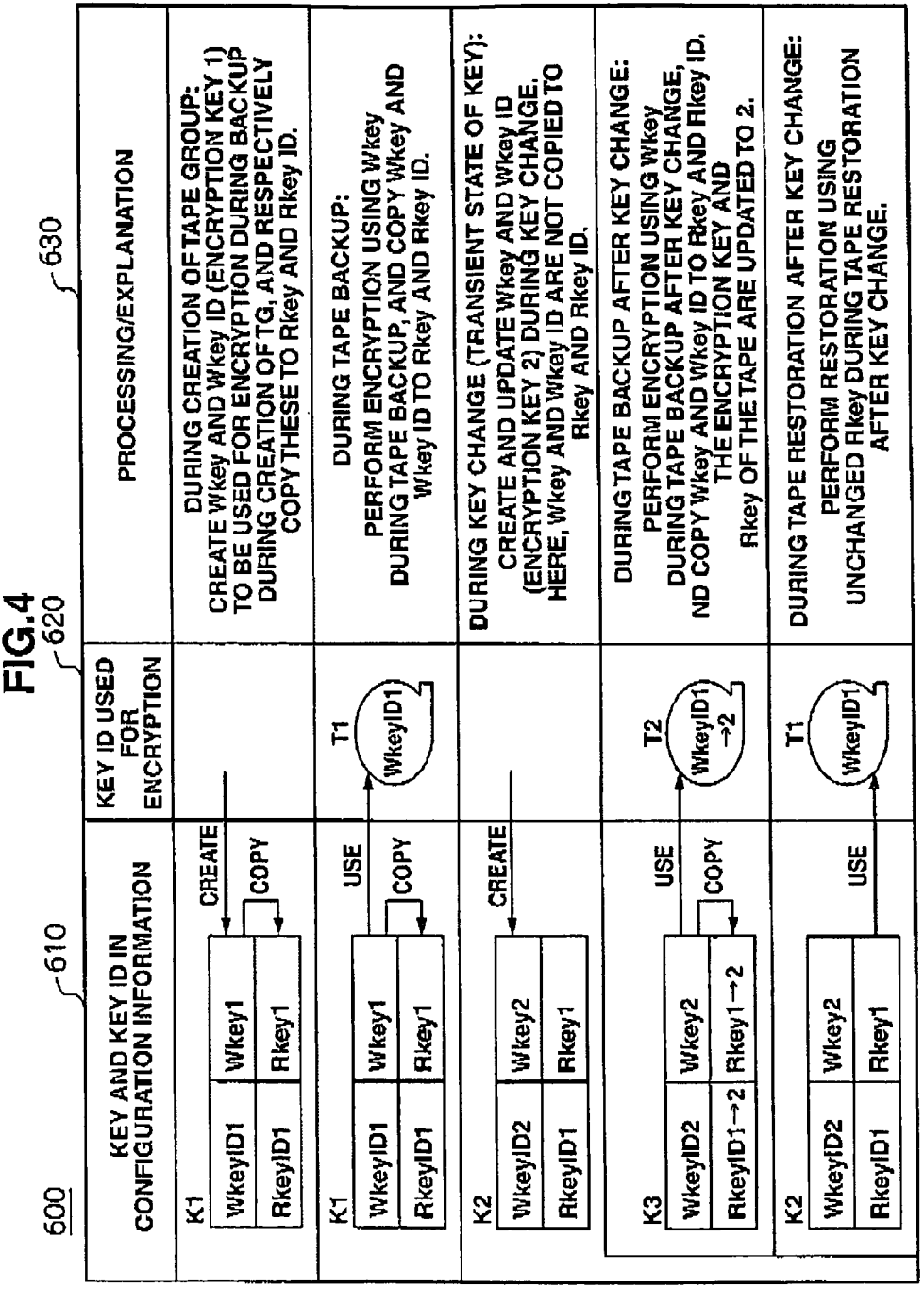
FIG. 4 is a transition diagram showing the transition of the change in state of a key and key ID according to the present invention.

Changes to the Wkey, the Wkey ID, the Rkey and the Rkey ID stored in the configuration information table 500 during the creation of a tape group, during tape backup, during key change, and during restoration are now explained. FIG. 4 is a transition diagram showing the changes of the foregoing statuses.

As shown in FIG. 4, the transition diagram 600 includes a column 610 showing the key and key ID in the configuration information, a column 620 showing the key used in the encryption, and a column 630 showing the processing/explanation, and, in order from the first row at the top to the fifth row at the bottom, shows the status of the keys (Wkey, Rkey) and key IDs (Wkey ID, Rkey ID) during the creation of a tape group, during tape backup, during key change (transient state of key), during tape backup after key change, and during tape restoration after key change.

In FIG. 4, Wkey 1 and Rkey 1, Wkey ID 1 and Rkey ID 1, Wkey 2 and Rkey 2, and Wkey ID 2 and Rkey ID 2 are respectively equivalent, K1 to K3 show the status of key information, and T1 and T2 show the status of the key ID in the tape.

The case of "during creation of tape group" in the first row of the transition diagram 600 is now explained. The column 630 describes that the processing of "create Wkey and Wkey ID (encryption key 1) to be used for encryption during backup during creation of TG, and respectively copy these to Rkey and Rkey ID" will be performed. The column 620 is an empty column since an encryption key is not copied during the creation of the tape group. The column 610 shows a status where the Wkey 1 and the Wkey ID 1 are created as the status K1 of the key, and these are copied as the Rkey and the Rkey ID 1.

The case of "during tape backup" in the second row of the transition diagram 600 is now explained. The column 630 describes that the processing of "perform encryption using Wkey during tape backup, and copy Wkey AND Wkey ID to Rkey and Rkey ID" will be performed. The column 620 is a status where the Wkey ID 1 is stored as the status T1 of the key in the tape. The column 610 shows a status where the status of the key is still the status K1, the Wkey 1 is to be used during the recording of data onto the tape, and the Wkey 1 and the Wkey ID 1 are copied as the Rkey 1 and the Rkey ID 1.

The case of "during key change" in the third row of the transition diagram 600 is now explained. The column 630 describes that the processing of "create and update Wkey AND Wkey ID (encryption key 2) during key change. Here, Wkey and Wkey ID are not copied to Rkey AND Rkey ID" will be performed. The column 620 is an empty column since processing such as backup of data is not performed. The column 610 shows a status where the Wkey 2 and the Wkey ID 2 are created as the status K2 of the key, and changed from the Wkey 1 and the Wkey ID 1. The Rkey 1 and the Rkey ID 1 are still the same from the status K1.

The case of "during data backup after key change" in the fourth row of the transition diagram 600 is now explained. The column 630 describes that the processing of "perform encryption using Wkey during tape backup after key change, and copy Wkey and Wkey ID to Rkey and Rkey ID. The encryption key and Rkey of the tape are updated to 2" will be performed. The column 620 is a status where the Wkey ID 1 was changed to the Wkey ID 2 as the status T2 of the key in the tape. The column 610 shows a status where the Wkey 2 and the Wkey ID 2 are copied as the Rkey 2 and the Rkey ID 2 as the status K3 of the key.

The case of "during tape restoration after key change" in the fifth row of the transition diagram 600 is now explained. The column 630 describes that the processing of "perform restoration using unchanged Rkey during tape restoration after key change" will be performed. The column 620 stores the Wkey ID 1 as the status T1 of the key in the tape. The column 610 shows the Wkey 2, the Wkey ID 2, the Rkey 1, and the Rkey ID 1 as the status K2 of the key information. Tape data is restored using this Rkey ID 1.

Figure 5:
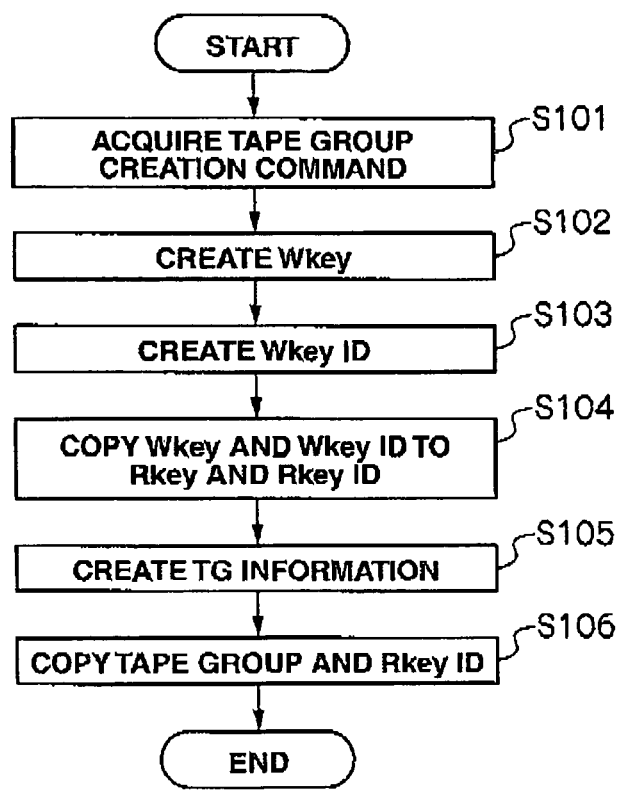
FIG. 5 is a flowchart showing tape group creation processing according to the present invention.

FIG. 5 is a flowchart showing the processing to be performed during the creation of a tape group.

At step S101, the VDL apparatus 300 acquires a tape group creation command. This command is acquired by the VDL apparatus 300 as a result of prescribed operations being performed in the management terminal 200 and such command being sent from the management terminal 200 to the VDL apparatus 300.

At step S102, the CPU 321 executes the random number generation program 323A to generate a random number, and the created encryption key is the Wkey. The CPU 321 thereafter encrypts the Wkey using the apparatus-specific information stored in the apparatus-specific information table 324F.

At step S103, the CPU 321 creates a Wkey ID with the Wkey created at step S102 as the Wkey ID.

At step S104, the CPU 321 creates an Rkey and an Rkey ID by setting the Wkey created at step S102 and the Wkey ID created at step S103 respectively as the Rkey and the Rkey ID. The CPU 321 thereafter encrypts the Rkey using the apparatus-specific information stored in the apparatus-specific information table 324F.

At step S105, the CPU 321 acquires other information including the created Wkey, Wkey ID, Rkey, and Rkey ID, and stores the acquired information in the configuration information table 500.

At step S106, the CPU 321 sends the information of the tape group and Rkey to the tape library apparatus, and stores information such as the TG number, Rkey ID and the like on the tape to become the tape group.

Figure 6:
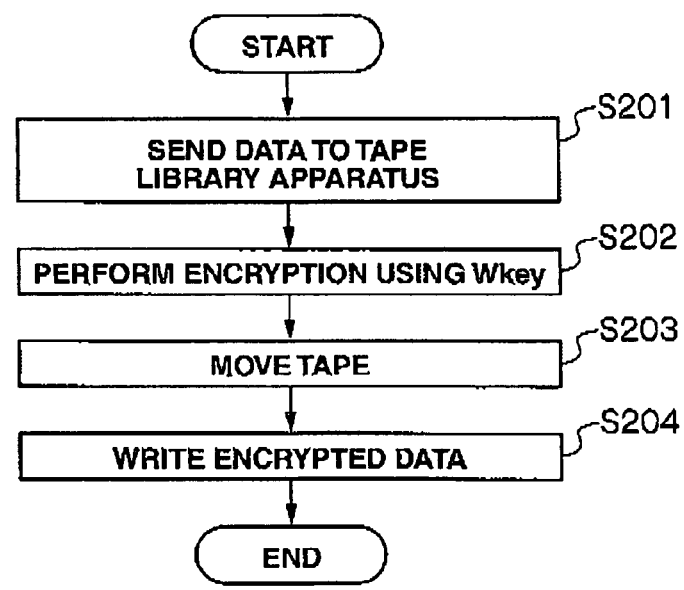
FIG. 6 is a flowchart showing processing to be performed during tape backup according to the present invention.

FIG. 6 is a flowchart showing the processing to be performed during tape backup.

At step S201, the CPU 321 sends data and the Wkey to the tape library apparatus 350. Here, the CPU 312 copies the Wkey ID and the Wkey ID of the configuration information table 500 as the Rkey and the Rkey ID.

At step S202, the controller 351 uses the Wkey stored in the memory 352 and controls the encoder/decoder unit 353 to encrypt the data.

At step S203, the transport mechanism unit 355 under the command of the CPU 321 transports the tape 356 storing the foregoing data to the tape drive 354. The processing at step S203 may be performed simultaneously with the processing at step S202, or the order of processing may be interchanged.

At step S204, the encrypted data is written onto the tape 356 with the tape drive 341.

The restoration of data using the TG information restoration processing and the key information restoration processing, and the restoration of data using the key information restoration processing after performing tape import in the storage system 1 are now explained respectively.

Figure 17:
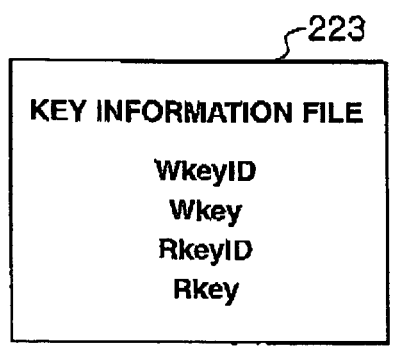
FIG. 17 is a diagram showing the contents stored in a key information file according to the present invention.
Figure 18:
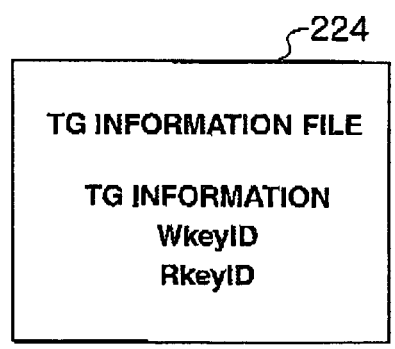
FIG. 18 is a diagram showing the contents stored in a tape group information file according to the present invention.

Here, the contents stored in the key information file 223 and the TG information file 224 of the management terminal 200 are explained. FIG. 17 is a diagram showing the information stored in the key information file 223. As shown in FIG. 17, the key information file stores the Wkey ID, the Wkey ID, the Rkey and the Rkey ID. Further, FIG. 18 is a diagram showing the contents stored in the TG information file 224. As shown in FIG. 18, among the contents stored in the configuration information table 500, the TG attribute (arbitrary information from the TG number column 510 to the encryption status column 519) information, the Wkey ID, and the Rkey ID are stored. In other words, the TG information file does not store the Wkey and the Rkey. The key information file 223 and the configuration information file 224 are backup files of the configuration information table 500

The restoration of data using the TG information restoration processing and the key information restoration processing is foremost explained.

Figure 10:
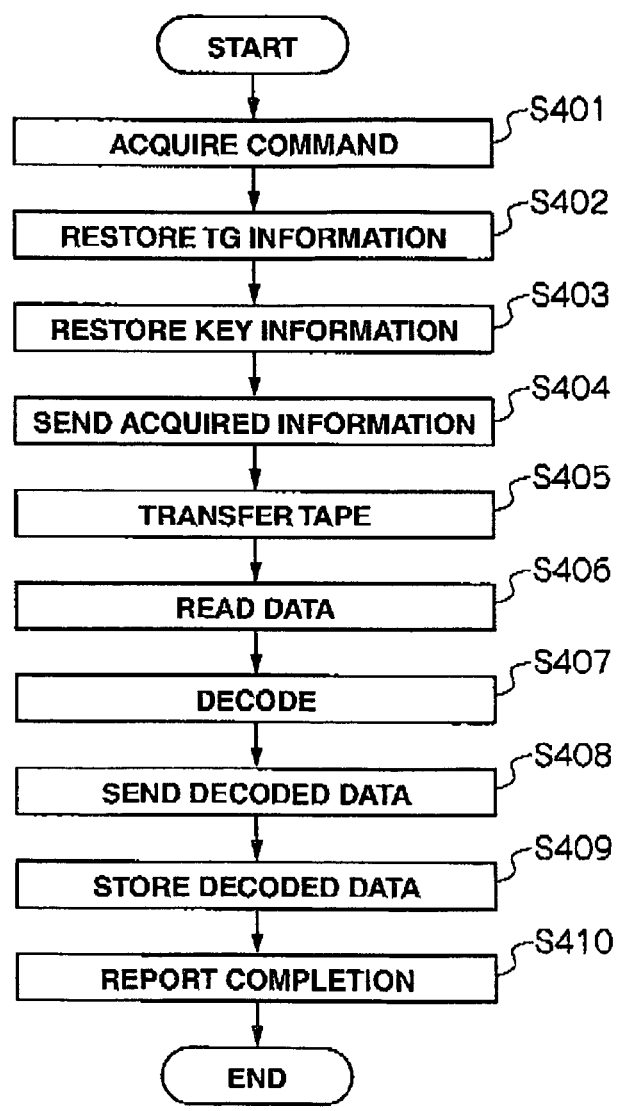
FIG. 10 is a flowchart showing restoration processing for restoring data using TG information restoration processing and key information restoration processing according to the present invention.

FIG. 7 is a view showing a frame format briefly explaining the restoration of data using the TG information restoration processing and the key information restoration processing. FIG. 10 is a flowchart showing this restoration processing.

As shown in FIG. 7 and FIG. 10, when the management terminal 200 receives a restoration command from the user (S401), it performs the TG information restoration (S402) and the key information restoration (S403) of the tape 356 to be restored according to the command. Here, the rewriting of key information of the configuration information table 500 is performed. If restoration cannot be performed, a message to such effect is displayed on a display device or the like (not shown) of the management terminal 200, and notified to the user.

The storage apparatus 310 sends the TG information and the key information to the tape library apparatus 350 (S404).

The tape library apparatus 350 transports the tape 356 identified in the TG to the tape drive 354 (S405), and reads data from that tape 356 (S406). The controller 361 uses the key information to control the encoder/decoder unit 353, and decrypts the encrypted data (S407). The decoded data is sent from the tape library apparatus 350 to the storage apparatus 310 (S408).

The storage apparatus 310 stores the decoded data in the LU corresponding to the TG (S409). The storage apparatus 310 reports the completion of data restoration to the management terminal 200 (S410).

The TG information restoration and the key information restoration in the data restoration using the TG information restoration processing and the key information restoration processing are explained below.

According to the transition diagram 600 described above, the status of the respective keys and key IDs during the creation of TG, after the key change, and after the key change backup will be (Wkey ID 1, Wkey 1, Rkey ID 1, Rkey 1) in the case of during the creation of TG, (Wkey ID 2, Wkey 2, Rkey ID 1, Rkey 1) in the case of after the key change, and (Wkey ID 2, Wkey 2, Rkey ID 2, Rkey 2) in the case of after the key change backup.

The statuses that can be adopted by the key ID stored in the TG information file 224 are (Wkey ID 1, Rkey ID 1) acquired with the key status being the K1 status, (Wkey ID 2, Rkey ID 1) acquired with the key status being the K2 status, and (Wkey ID 2, Rkey ID 2) acquired with the key status being the K3 status.

FIG. 8 is a state diagram showing the status of keys and key IDs after the restoration of TG information based on the TG information restoration under the preconditions based on the transition diagram 600.

As shown in FIG. 8, the state diagram 700 includes a number column 710, a TG information file content column 720, and a configuration information after TG information restoration column 730. The number column 710 shows the number. The TG information file content column 720 shows the specific contents of the TG information file. The configuration information after TG information restoration column 730 shows the contents of the configuration information after performing the TG information restoration.

Number "1" shows the TG information restoration processing that will use the TG information file acquired during the creation of the TG. Contents of the TG information file show TG number n, backup date and time, TG attribute, etc., and further show that the Wkey ID is "Wkey ID 1," and the Rkey ID is "Rkey ID 1." As a result of the TG information restoration being performed, the configuration information will show TG number; n, backup date and time, TG attribute, etc., and further show that the Wkey ID is "Wkey ID 1," the Rkey ID is "Rkey ID 1," the Wkey is "Invalid," and the Rkey is "Invalid."

Number "2" shows the TG information restoration processing that will use the TG information file acquired during the key change. Contents of the TG information file show TG number: n, backup date and time, TG attribute, etc., and further show that the Wkey ID is "Wkey ID 2," and the Rkey ID is "Rkey ID 1." As a result of the TG information restoration being performed, the configuration information will show TG number: n, backup date and time, TG attribute, etc., and further show that the Wkey ID is "Wkey ID 2," the Rkey ID is "Rkey ID," the Wkey is "Invalid," and the Rkey is "Invalid."

Number "3" shows the TG information restoration processing that will use the TG information file acquired during the tape backup after the key change. Contents of the TG information file show TG number: n, backup date and time, TG attribute, etc., and further show that the Wkey ID is "Wkey ID 2," and the Rkey ID is "Rkey ID 2." As a result of the TG information restoration being performed, the configuration information will show TG number: n, backup date and time, TG attribute, etc., and further show that the Wkey ID is "Wkey ID 2," the Rkey ID is "Rkey ID 2," the Wkey is "Invalid," and the Rkey is "Invalid."

FIG. 9 is a state diagram showing the state of the keys and key IDs restored in the key information restoration performed after the TG information restoration. The statuses of the keys and key IDs restored in the TG information restoration can additionally adopt three status based on the key information restoration. The nine statuses are respectively explained below. The specific processing contents of the key change restoration processing will be explained later with reference to FIG. 11.

As shown in FIG. 9, the state diagram 800 includes a number column 810, a configuration information after TG information restoration column 820, a key information file content column 830, and a configuration information after key information restoration column 840. The number column 810 shows the number. The configuration information after TG information restoration column 820 shows the same contents as the configuration information after TG information restoration column 730 illustrated in the state diagram of FIG. 8. The key information file content column 830 shows the contents of the key information file after the key information restoration. The configuration information after key information restoration column 840 shows the configuration information after the key information restoration.

Numbers "1" to "3" show the configuration information after the TG information restoration of number "1" in FIG. 8. The respective contents of numbers "1" to "3" are now explained. In the ensuing explanation, the Wkey ID 3 and the Wkey 3 are the key ID and key newly created during the key information restoration.

As the key information file of number "1" shown are TG number: n, Wkey ID; Wkey ID 1, Wkey: Wkey 1, Rkey ID; Rkey ID 1, and Rkey: Rkey 1. As the configuration information after key information restoration shown are TG number: n, backup date and time, TG attribute, etc., Wkey ID: Wkey ID 1, Wkey: Wkey 1, Rkey ID: Rkey ID 1, and Rkey: Rkey 1.

As the key information file of number "2" shown are TG number: n, Wkey ID: Wkey ID 2, Wkey: Wkey 2, Rkey ID: Rkey ID 1, and Rkey: Rkey 1. As the configuration after key information restoration shown are TG number: n, backup date and time, TG attribute etc., Wkey ID: Wkey ID 3, Wkey: Wkey 3, Rkey ID: Rkey ID 1, AND Rkey: Rkey 1.

As the key information file of number "3" shown are TG number: n, Wkey ID; Wkey ID 2, Wkey: Wkey 2, Rkey ID: Rkey ID 2, and Rkey: Rkey 2. Here, as the configuration information after key Information restoration, it is shown that the key information restoration is not possible.

Numbers "4" to "6" show the configuration information after TG information restoration of number "2" In FIG. 8. The respective contents of numbers "4" to "6" are now explained.

As the key information file of number "4" shown are TG number: n, Wkey ID: Wkey ID 1, Wkey; Wkey 1, Rkey ID: Rkey ID 1, and Rkey: Rkey 1. As the configuration information after key information restoration shown are TG number: n, backup date and time, TG attribute etc., Wkey ID: Wkey ID 3, Wkey: Wkey 3, Rkey ID: Rkey ID 1, and Rkey: Rkey 1.

As the key information file of number "5" shown are TG number; n, Wkey ID: Wkey ID 2, Wkey: Wkey 2, Rkey ID: Rkey ID 1, and Rkey: Rkey 1. As the configuration information after key information restoration shown are TG number n, backup date and time, TG attribute etc., Wkey ID: Wkey ID 2, Wkey: Wkey 2, Rkey ID: Rkey ID 1, and Rkey: Rkey 1.

As the key information file of number "6" shown are TG number: n, Wkey ID: Wkey ID 2, Wkey: Wkey 2, Rkey ID: Rkey ID 2, and Rkey: Rkey 2. Here, as the configuration information after key information restoration, it is shown that the key information restoration is not possible.

Numbers "7" to "9" show the configuration information after TG information restoration of number "3" in FIG. 8. The respective contents of numbers "7" to "9" are now explained.

As the key information file of number "7" shown are TG number: n, Wkey ID: Wkey ID 1, Wkey: Wkey 1, Rkey ID: Rkey ID 1, and Rkey: Rkey 1. Here, as the configuration Information after key information restoration, it is shown that the key information restoration is not possible.

As the key information file of number "8" shown are TG number: n, Wkey ID: Wkey ID 2, Wkey: Wkey 2, Rkey ID: Rkey ID 1, and Rkey: Rkey 1. As the configuration information after key information restoration shown are TG number: n, backup date and time, TG attribute etc., Wkey ID: Wkey ID 2, Wkey: Wkey 2, Rkey ID: Rkey ID 2, and Rkey: Rkey 2.

As the key information file of number "9" shown are TG number: n, Wkey ID: Wkey ID 2, Wkey: Wkey 2, Rkey ID: Rkey ID 2, and Rkey: Rkey 2. As the configuration information after key information restoration shown are TG number: n, backup date and time, TG attribute etc., Wkey ID: Wkey ID 2, Wkey; Wkey 2, Rkey ID: Rkey ID 2, and Rkey; Rkey 2.

The key information restoration processing is now explained. FIG. 11 is a flowchart showing the key information restoration processing.

At step S301, the CPU 210 compares the Rkey ID of the configuration information and the Wkey ID, Rkey ID of the key information file 223. If they do not match, at step S302, the CPU 210 fails in the key restoration of that TG.

Meanwhile, if they match at step S302, the CPU 210 compares the Wkey ID of the configuration information and the Wkey ID of the key information file. If they match, at step S304, the CPU 210 copies the Wkey of the key information file 223 to the Wkey of the configuration information table 500. If they do not match, at step S305, the CPU 210 newly creates a Wkey, and stores the Wkey ID and the Wkey in the configuration information table 500.

At step S306, the CPU 210 copies the key that matched the Rkey ID of the configuration information to the Rkey of the configuration information using the Wkey ID or the Rkey ID of the key information file 223. The key information restoration processing is thereby ended, and the Wkey ID, the Wkey, the Rkey ID, and the Rkey of the configuration information table 500 are restored.

The data restoration using the key information restoration processing after performing tape import is now explained.

Figure 15:
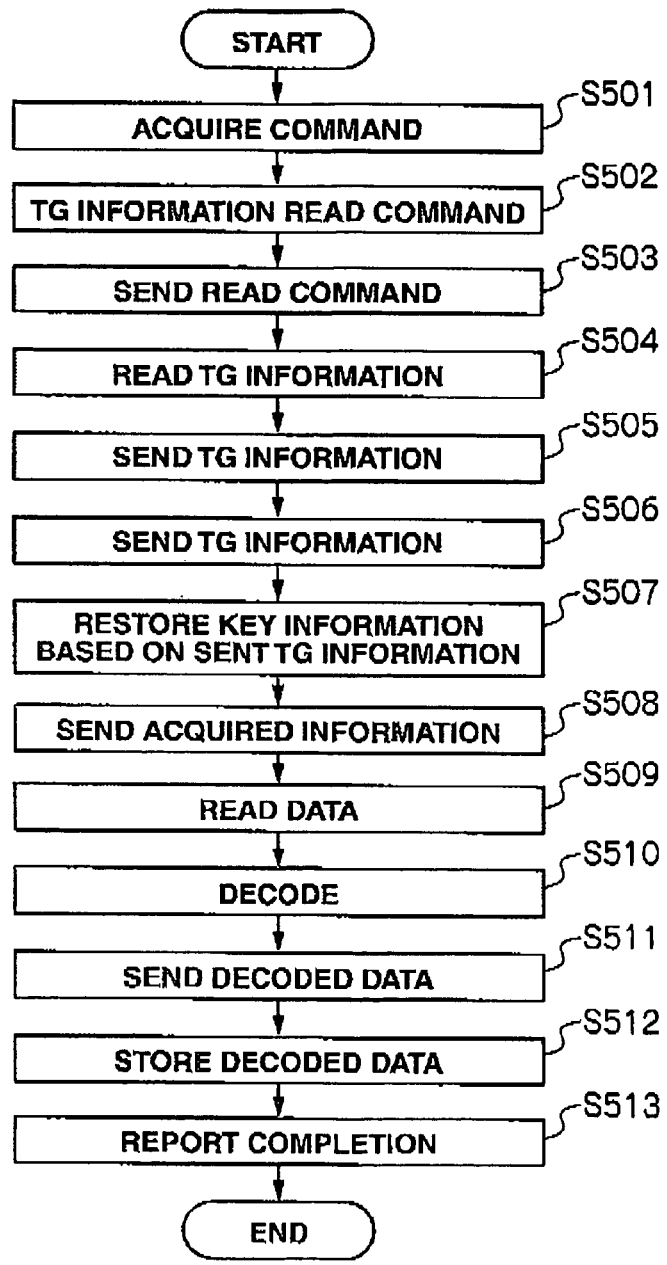
FIG. 15 is a flowchart showing restoration processing for restoring data using key information restoration processing after performing tape import according to the present invention.

FIG. 12 is a view showing a frame format briefly explaining the data restoration using the key information restoration processing after performing tape import. FIG. 15 is a flowchart showing this restoration processing.

As shown in FIG. 12 and FIG. 15, for instance, the user imports the tape 356 by inserting the tape 356 from the VDL apparatus 400 into the tape drive 354 of the VDL apparatus 300. The user operates the management terminal 200 to read the TG information of the tape 356 inserted into the tape drive 354. When the management terminal 200 acquires a command for reading the TG information according to the user's operation (S501), it commands the storage apparatus 310 to read the TG information (S502).

When the storage apparatus 310 receives a read command from the management terminal 200, it causes the tape library apparatus 350 to read the TG information from the tape 356 based on such command (S504).

After the tape library apparatus 350 reads the TG information from the tape 356, it sends the TG information to the storage apparatus 310 (S50S). The storage apparatus 310 sends the TG information to the management terminal 200 (S506).

The management terminal 200 performs key information restoration based on the TG information sent from the storage apparatus 310 (S507). The key information restoration processing to be performed here is the same as the processing explained with reference to FIG. 11.

Then, the storage apparatus 310 sends the TG information and the key information to the tape library apparatus 350 (S508).

The tape library apparatus 350 reads the data from the tape 356 (S509). The controller 351 uses the key information and controls the encoder/decoder unit 353 to decode the encrypted data (S510). The decoded data is then sent from the tape library apparatus 350 to the storage apparatus 310 (S511).

The storage apparatus 310 stores the decoded data in the LU corresponding to the TG (S512). The storage apparatus 310 thereafter reports the completion of data restoration to the management terminal 200 (S513).

The key information restoration in the data restoration using the key information restoration processing after performing tape import is now explained.

According to the transition diagram 600 described above, the status of the respective keys and key IDs during the creation of TG, after the key change, and after the key change backup will be (Wkey ID 1, Wkey 1, Rkey ID 1, Rkey 1) in the case of during the creation of TG, (Wkey ID 2, Wkey 2, Rkey ID 1, Rkey 1) in the case of after the key change, and (Wkey ID 2, Wkey 2, Rkey ID 2, Rkey 2) in the case of after the key change backup.

The statuses that can be adopted by the key ID stored in the TG information file 224 are (Wkey ID 1, Rkey ID 1) acquired with the key ID status being the T1 status, and (Wkey ID 2, Rkey ID 2) acquired with the key ID status being the T2 status.

FIG. 13 is a state diagram showing the status of keys and key IDs after the restoration of TG information based on the tape import under the preconditions based on the transition diagram 600.

As shown in FIG. 13, the state diagram 900 includes a number column 910, a tape content management information content column 920, and a configuration information after tape import column 930. The number column 910 shows the number. The tape content management information content column 920 shows the management information being managed in the tape. The configuration information after tape import column 930 shows the configuration information after tape import.

Number "1" shows the processing to be performed when importing a tape that was backed up before the key change. Contents of the management information in the tape show TG number: n, backup date and time, TG attribute, etc., and further show that the Wkey ID is "Wkey ID 1." As the configuration information after tape import shown are TG number: n, backup date and time, TG attribute, etc., and further show that the Wkey ID is "Wkey ID 1," the Wkey is "Invalid," the Rkey ID is "Rkey ID 1," and the Rkey is "Invalid."

Number "2" shows the processing to be performed when importing a tape that was backed up after the key change. Contents of the management information in the tape show TG number: n, backup date and time, TG attribute, etc., and further show that the Wkey ID is "Wkey ID 2." As the configuration information after tape import shown are TG number: n, backup date and time, TG attribute, etc., and further show that the Wkey ID is "Wkey ID 2," the Wkey is "Invalid," the Rkey ID is "Rkey ID 2," and the Rkey is "Invalid."

FIG. 14 is a state diagram showing the state of the keys and key IDs restored in the key Information restoration performed after the TG information restoration. The statuses of the keys and key IDs restored in the TG information restoration can additionally adopt three status based on the key information restoration. The six statuses are respectively explained below. The specific processing contents of the key change restoration processing are the same as FIG. 11, and the explanation thereof is omitted.

As shown in FIG. 14, the state diagram 1000 includes a number column 1010, a configuration information after tape import column 1030, a key information file content column 1020, and a configuration information after key information restoration column 1040. The number column 1010 shows the number. The configuration information after tape import column 1020 shows the same contents as the configuration information after TG information restoration column 930 of the state diagram 900 illustrated in FIG. 13. The key information file content column 1030 shows the contents of the key information file after key information restoration. The configuration information after key information restoration column 1040 shows the configuration information after the key information restoration.

Numbers "1" to "3" show the configuration information after tape import of number "1" in FIG. 13. The respective contents of numbers "1" to "3" are now explained. In the ensuing explanation, the Wkey ID 3 and the Wkey 3 are the key ID and key newly created during the key information restoration.

As the key information file of number "1" shown are TG number: n, Wkey ID: Wkey ID 1, Wkey: Wkey 1, Rkey ID: Rkey ID 1, and Rkey; Rkey 1. As the configuration information after tape import shown are TG number n, backup date and time, TG attribute etc., Wkey ID: Wkey ID 1, Wkey: Wkey 1, Rkey ID: Rkey ID 1, and Rkey: Rkey 1.

As the key information file of number "2" shown are TG number: n, Wkey ID: Wkey ID 2, Wkey: Wkey 2, Rkey ID; Rkey ID 1, and Rkey: Rkey 1. As the configuration information after key information restoration shown are TG number: n, backup date and time, TG attribute etc., Wkey ID: Wkey ID 3, Wkey: Wkey 3, Rkey ID: Rkey ID 1, and Rkey; Rkey 1.

As the key information file of number "3" shown are TG number n, Wkey ID: Wkey ID 2, Wkey: Wkey 2, Rkey ID: Rkey ID 2, and Rkey: Rkey 2. Here, as the configuration information after key information restoration, it is shown that the key information restoration is not possible.

Numbers "4" to "6" show the configuration information after tape import of number "2" in FIG. 13. The respective contents of numbers "1" to "3" are now explained.

As the key information file of number "4" shown are TG number: n, Wkey ID; Wkey ID 1, Wkey: Wkey 1, Rkey ID: Rkey ID 1, and Rkey: Rkey 1. Here, as the configuration information after key information restoration, it is shown that the key information restoration is not possible.

As the key information file of number "5" shown are TG number: n, Wkey ID: Wkey ID 2, Wkey: Wkey 2, Rkey ID; Rkey ID 1, and Rkey: Rkey 1. As the configuration information after key information restoration shown are TG number: n, backup date and time, TG attribute etc., Wkey ID: Wkey ID 2, Wkey: Wkey 2, Rkey ID: Rkey ID 2, and Rkey: Rkey 2.

As the key information file of number "6" shown are TG number: n, Wkey ID: Wkey ID 2, Wkey: Wkey 2, Rkey ID: Rkey ID 2, and Rkey: Rkey 2. As the configuration information after key information restoration shown are TG number; n, backup date and time, TG attribute etc., Wkey ID: Wkey ID 2, Wkey: Wkey 2, Rkey ID: Rkey ID 2, and Rkey: Rkey 2.

According to the present embodiment, the storage system 1 is able to restore the Rkey even when the Wkey and the Rkey are changed by using two types of keys; namely, the Wkey and Rkey, and backing up the key information file 223 and the TG information file 224 at a timing that these are newly created in both cases of restoring data stored in the tape of the VDL apparatus 300 or importing tape from another VDL apparatus 400 to the VDL apparatus 300 when the key for encrypting data has been changed. Thus, restoration of data from the tape can be conducted without the user having to perform key information restoration, and it is thereby possible to spare the user from the trouble of restoring key information.

The present invention can be broadly applied to a storage system, and its encryption key management method and encryption key management program.

What is claimed is:

1. A storage system, comprising:
a storage apparatus;
a tape library apparatus for backing up data stored in the storage apparatus; and
a management terminal for managing said storage apparatus and said tape library apparatus;
wherein said storage apparatus includes:
a key creation unit for creating a write key for encrypting data upon backing up data in a tape of said tape library apparatus, a write key ID of the write key, a read key for decrypting data that was encrypted with said write key, and a read key ID of the read key, and updating said write key and said write key ID without updating said read key and said read key ID; and
a management information file for associating management information concerning data with said created write key, write key ID, read key, and read key ID upon backing up said data in said storage apparatus to the tape in said tape library apparatus;
wherein said tape library apparatus includes:
a data processing unit for encrypting data using said write key ID upon writing data into said tape, and decrypting data of said tape using said read key ID upon reading data from said tape;
wherein said tape includes:
a tape management file containing at least said write key ID and said read key ID among said management information; and
wherein said management terminal includes:
a tape group information file for backing up information containing said write key ID and said read key ID stored in said management information file;
a key information file for backing up said write key, said write key ID, said read key and said read key ID stored in said management information file;
a key information processing unit for comparing said management information file with said key information file and, if said read key ID in said management information file matches said write key ID or said read key ID in said key information file, restoring said key information file to said management information file; and
a command unit for commanding restoration of a key of said tape based on said management information file restored by said key information processing unit, and
wherein the key information processing unit restores said key information file to said management information file by:
if said read key ID in said management information file matches both said write key ID and said read key ID in said key information file and said write key ID in said management information file matches said write key ID in said key information file, creating an updated write key and an updated write key ID and storing said updated write key and said updated write key ID in said management information file as said write key and said write key ID in said management information file,
if said read key ID in said management information file matches both said write key ID and said read key ID in said key information file and said write key ID in said management information file does not match said write key ID in said key information file, copying said write key in said key information file to said management information file as said write key in said management information file,
if said write key ID in said management information file matches said read key ID in said management information file, copying said write key in said key information file to said management information file as said read key in said management information file, and
if said read key ID in said key information file matches said read key ID in said management information file, copying said read key in said key information file to said management information file as said read key in said management information file.

2. The storage system according to claim 1, wherein said key creation unit creates a new write key, a write key ID, a read key and a read key ID upon receiving a setup command from said management terminal for backing up data in said tape; and wherein said management terminal backs up said key information file upon receiving said setup command, upon changing the key to said new write key, write key ID, read key and read key ID, and upon backing up data in said tape after changing said key.

3. The storage system according to claim 2, wherein the designation of the tape in said tape library apparatus to be restored is based on a command from said management terminal.

4. The storage system according to claim 2, wherein said storage system includes a second tape library apparatus that is different from said tape library apparatus; and wherein, upon importing a tape in said tape library apparatus to said different second tape library apparatus, said management terminal restores the data stored in the imported tape.

5. The storage system according to claim 1, wherein said storage apparatus includes a random number generation unit; and wherein said key creation unit creates said write key using a random number generated with said random number generation unit.

6. The storage system according to claim 5, further comprising:

an apparatus-specific information storage unit for storing apparatus-specific information which is information that is unique to the storage apparatus; and wherein said write key and said read key are encrypted with said apparatus-specific information upon being stored in said management information file, and said write key and said read key are decrypted with said apparatus-specific information upon being read from said management information file.

7. The storage system according to claim 6, wherein said apparatus-specific information is a serial number.

8. The storage system according to claim 2, wherein said write key and said read key, and said write key ID and said read key ID are respectively equivalent.

9. The storage system according to claim 2, wherein said write key ID is a unique ID in said storage system.

10. The storage system according to claim 1, wherein management information concerning said data includes tape group information corresponding to a logical unit for backing up data in said storage apparatus.

11. An encryption key management method of a storage system comprising a storage apparatus; a tape library apparatus for backing up data stored in the storage apparatus; and a management terminal for managing said storage apparatus and said tape library apparatus;

wherein said storage apparatus includes:

a key creation unit for creating a write key for encrypting data upon backing up data in a tape of said tape library apparatus, a write key ID of the write key, a read key for decrypting data that was encrypted with said write key, and a read key ID of the read key, and updating said write key and said write key ID without updating said read key and said read key ID; and a management information file for associating management information concerning data with said created write key, write key ID, read key, and read key ID upon backing up said data in said storage apparatus to the tape in said tape library apparatus;

wherein said tape library apparatus includes:

a data processing unit for encrypting data using said write key ID upon writing data into said tape, and decrypting data of said tape using said read key ID upon reading data from said tape;

wherein said tape includes:

a tape management file containing at least said write ID and said read key ID among said management information wherein said management terminal includes:

a tape group information file for backing up information containing said write key ID and said read key ID stored in said management information file;

a key information file for backing up said write key, said write key ID, said read key and said read key ID stored in said management information file; and wherein said encryption key management method comprises:

comparing said management information file with said key information file; and if said read key ID in said management information file matches said write key ID or said read key ID in said key information file, restoring said key information file to said management information file by:

if said read key ID in said management information file matches both said write key ID and said read key ID in said key information file and said write key ID in said management information file matches said write key ID in said key information file, creating an updated write key and an updated write key ID and storing said updated write key and said updated write key ID in said management information file as said write key and said write key ID in said management information file;

if said read key ID in said management information file matches both said write key ID and said read key ID in said key information file and said write key ID in said management information file does not match said write key ID in said key information file, copying said write key in said key information file to said management information file as said write key in said management information file;

if said write key ID in said management information file matches said read key ID in said management information file, copying said write key in said key information file to said management information file as said read key in said management information file;

if said read key ID in said key information file matches said read key ID in said management information file, copying said read key in said key information file to said management information file as said read key in said management information file; and commanding restoration of a key of said tape based on said management information file restored with said key information processing unit.

12. The encryption key management method of a storage system according to claim 11, wherein said key creation unit a new write key, a write key ID, a second key and a second key ID upon receiving a setup command from said management terminal for backing up data in said tape; and Wherein said management terminal backs up said key information file upon receiving said setup command, upon changing the key to said new write key, write key ID, second key and second key ID, and upon backing up data in said tape after changing said key.

13. A non-transitory computer-usable medium having computer readable instructions stored thereon for execution by a processor of a management terminal for managing a storage apparatus and a tape library apparatus for backing up data stored in the storage apparatus in a storage system to perform an encryption key management method of the storage system;

wherein said storage apparatus includes:
a key creation unit for creating a write key for encrypting data upon backing up data in a tape of said tape library apparatus, a write key ID of the write key, a read key for decrypting data that was encrypted with said write key, and a read key ID of the read key, and updating said write key and said write key ID without updating said read key and said read key ID; and
a management information file for associating management information concerning data with said created write key, write key ID, read key, and read key ID upon backing up said data in said storage apparatus to the tape in said tape library apparatus;

wherein said tape library apparatus includes:
a data processing unit for encrypting data using said write key ID upon writing data into said tape, and decrypting data of said tape using said read key ID upon reading data from said tape;

wherein said tape includes:
a tape management file containing at least said write key ID and said read key ID among said management information;

wherein said management terminal includes:
a tape group information file for backing up information containing said write key ID and said read key ID stored in said management information file; and
a key information file for backing up said write key, said write key ID, said read key and said read key ID stored in said management information file;

said encryption key management method comprising:
comparing said management information file with said key information file;
if said read key ID in said management information file matches said write key ID or said read key ID in said key information file, restoring said key information file to said management information file by:
if said second key ID in said management information file matches both said first key ID and said second key ID in said key information file and said first key ID in said management information file matches said first key ID in said key information file, creating an updated first key and an updated first key ID and storing said updated first key and said updated first key ID in said management information file, and
if said read key ID in said management information file matches both said write key ID and said read key ID in said key information file and said write key ID in said management information file matches said write key ID in said key information file, creating an updated write key and an updated write key ID and storing said updated write key and said updated write key ID in said management information file as said write key and said write key ID in said management information file,
if said read key ID in said management information file matches both said write key ID and said read key ID in said key information file and said write key ID in said management information file does not match said write key ID in said key information file, copying said write key in said key information file to said management information file as said write key in said management information file,
if said write key ID in said management information file matches said read key ID in said management information file, copying said write key in said key information file to said management information file as said read key in said management information file, and
if said read key ID in said key information file matches said read key ID in said management information file, copying said read key in said key information file to said management information file as said read key in said management information file; and
commanding restoration of a key of said tape based on said management information file restored with said key information processing unit.

14. The computer-usable medium according to claim 13, wherein said key creation unit creates a new write key, a write key ID, a read key and a read key ID upon receiving a setup command from said management terminal for backing up data in said tape; and
wherein said encryption key management program causes said management terminal to function as means for backing up said key information file upon receiving said setup command, upon changing the key to said new write key, write key ID, read key and read key ID, and upon backing up data in said tape after changing said key.

* * * * *